2,446,090

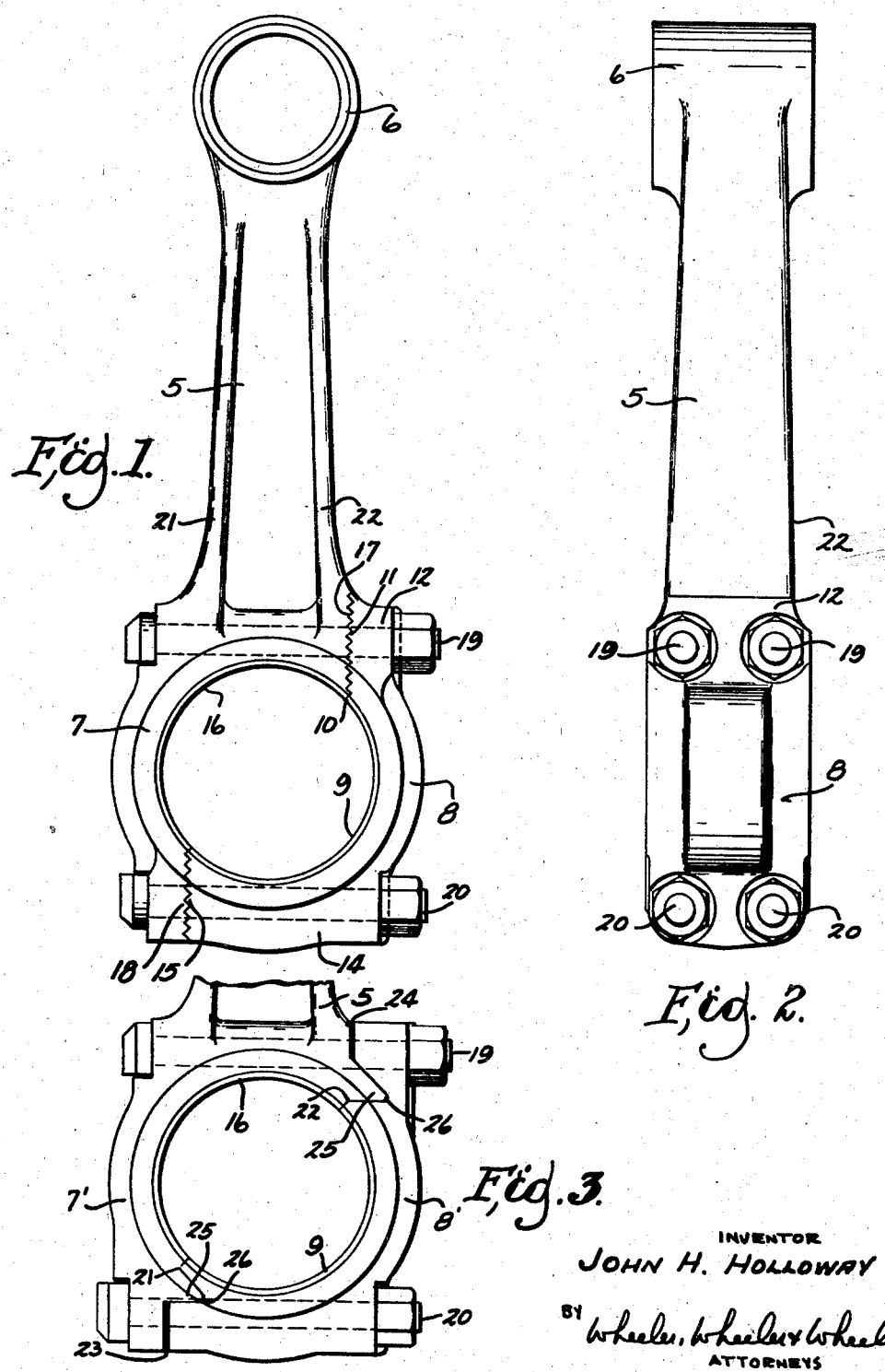
July 27, 1948.  J. H. HOLLOWAY  2,446,090
CONNECTING ROD FOR INTERNAL-COMBUSTION ENGINES
Filed April 20, 1945
INVENTOR
JOHN H. HOLLOWAY Patented July 27, 1948

UNITED STATES PATENT OFFICE 2,446,090

CONNECTING ROD FOR INTERNAL-COMBUSTION ENGINES

John H. Holloway, Green Bay, Wis.

Application April 20, 1945, Serial No. 589,383

4 Claims. (Cl. 74—579)

This invention relates to improvements in connecting rods for internal combustion engines.

In certain internal combustion engines, it is desirable that the connecting rod be removable through the cylinder, thereby making possible the replacement of the rod without taking out the crank shaft. Yet in many instances, the required crank shaft bearing end of the rod is too large to pass through the cylinder. The problem of constructing the crank shaft bearing end of the rod to pass through the cylinder is further complicated by the fact that it is desirable to provide a sturdy connection between the shank of the connecting rod and its crank shaft bearing portion; by the fact that it is desirable to provide a substantially continuous and unbroken bearing surface across the top of the bearing portion where thrust is greatest during engine operation; and by the fact that it is desirable to relieve from tension stress the bolts connecting the removable cap to the rod.

I seek by the present invention to provide a rod achieving all of the desirable objectives aforesaid. The rod herein disclosed will pass freely through the cylinder despite the fact that it has a sturdy connection between its shank and crank shaft bearing portion and despite the fact that its bearing surface is continuous across the top of such portion and the cap is dismountable in a manner which does not subject the retaining bolts to stress during the use of the rod.

Other objects of the invention will be apparent to those skilled in the art upon analysis of the following disclosure thereof.

In the drawings:

Fig. 1 is a front elevation of a connecting rod embodying the invention.

Fig. 2 is a side elevation of the rod shown in Fig. 1.

Fig. 3 is a view in front elevation of the crank shaft bearing end of a connecting rod showing a modified embodiment of the invention.

The parts are identified by the same reference characters throughout the several views.

The connecting rod illustrated is of the type in which the crank shaft bearing is so large that but for the invention herein disclosed, the rod would not be susceptible of withdrawal through the cylinder. The connecting rod as herein disclosed comprises a shank portion 5 at the upper end of which is the conventional wrist pin bearing portion 6. At the lower end of the rod is a crank shaft bearing comprising a portion 7 fixed to the shank and a removable cap portion 8.

The removable cap portion 8 is roughly J-shaped in front elevation. Its bearing surface at 9 is approximately 180 degrees in extent, terminating on a diameter which is approximately 45 degrees to the vertical (the longitudinal center line of the rod being assumed to be vertical). Above the upper end 10 of the bushing or liner which provides the bearing surface 9, the cap 8 is provided with keys in the form of serrations 11 on the faces of mounting portion 12. The serrations extend transversely of the mounting portion 12 in an otherwise vertical surface, that is to say, a surface parallel to the longitudinal center line of the rod and extending from front to rear thereof.

At its bottom, the cap portion 8 is provided with another mounting portion at 14 which extends in a generally horizontal direction instead of a vertical direction. At its end, the mounting portion 14 is provided with transversely extending serrations 15 in an end face which is otherwise vertical, that is to say, parallel to the longitudinal center line of the rod and extending from front to rear thereof. The faces provided with serrations at 11 and 15 are, but for the serrations, parallel to each other in the preferred construction.

The crank shaft bearing portion 7 which is fixed to the rod likewise has a bearing surface 16 approximately 180 degrees in extent. It terminates at 17 in a serrated face complementary to the serrations at 11 and is provided at 18 with a serrated face complementary to the serrations at 15 of the cap. Upper and lower pairs of bolts 19 and 20, respectively, releasably hold the cap portion 8 to the fixed bearing portion 7.

It will be observed that both of the reenforcing ribs 21 and 22 of the shank portion of the rod connect to the fixed bearing portion 7 at the crank shaft bearing end of the rod. Thus extremely sturdy connection between the shank portion and the bearing portion is provided despite the fact that a part of the joint between the fixed bearing portion 7 and the cap portion 8 is effected near the top of the bearing.

It will further be observed that the bearing surface 16 is continuous across most of the top of the bearing. Both on the expansion stroke and the compression stroke, the thrust between the bearing and the crank shaft is exerted upwardly and the continuous bearing surface 16 is in a position to take this thrust.

Although the transverse keys 11 and 15 engage respectively with keys 17 and 18 in a lateral direction, the diameter of the crank shaft bearing upon which the joint between bearing surfaces 9 and 16 is effected extends diagonally across the bearing, being neither lateral nor vertical. The bolts 19 and 20 are thereby relieved quite largely of stress, both in tension and in shear other than such as is required to hold the bearing cap 8 in assembly with the fixed bearing portion 7. This is a very desirable arrangement inasmuch as it has been noted in some connecting rod assemblies where the bolts are under tension or shear that the caps have become loosened during operation as a result of repeated tension or shearing strains. Nevertheless, due to the novel disposition of the bearing surfaces 9 and 16 of the cap and the fixed portion of the bearing, and the relation of the surfaces aforesaid to the abutting faces of the cap and the fixed portion of the bearing, it is possible to omit the serrations without leaving the cap bolts 19 and 20 subject to stresses other than in the direction of shear, in which direction (longitudinally of the rod) the bolts 19 and 20 may be adequate to handle such stresses without displacement. In that event, the serrations may be omitted, if desired.

In the modified embodiment shown in Fig. 3, the joint between the cap 8' and that portion 7' of the bearing which is fixed to the rod 5 is effected in a diagonal diametrical plane between points 21 and 22. From these points, the complementary surfaces extend respectively downwardly and upwardly to the points 23, 24, transverse keying being effected by means of ribs 25 on one member and corresponding channels 26 in the other. A variety of other keying arrangements within the contemplation of the invention will be suggested to those skilled in the art by the examples given.

I claim:

1. A connecting rod having a wrist pin bearing and a crank shaft bearing and a shank portion extending substantially along a longitudinal center line between said bearings, the crank shaft bearing comprising a fixed bearing portion in permanent connection with the shank portion, and a removable cap portion connected with the fixed bearing portion, the fixed bearing portion and the cap together providing a bearing surface divided as between the cap and the fixed bearing portion upon a diameter of said bearing lying diagonally between said longitudinal center line and a line at right angles thereto, and bolt means extending transversely respecting said longitudinal center line providing a releasable connection between the cap portion and the fixed portion of the crank shaft bearing, the said fixed and cap portions having complementary abutting surfaces extending in opposite directions from said diameter in general parallelism with said center line, said surfaces having interengaging key means transverse with respect to the bolt means and said center line.

2. A connecting rod comprising a shank having reenforced margins, and crank shaft bearing means at the lower end of the rod comprising a fixed bearing portion with integral connection with the shank portion and with which both of the reenforced margins merge, said fixed bearing portion providing a crank shaft bearing surface extending arcuately for approximately 180 degrees across the top and about one side of the bearing means, said surface terminating on a diameter of the bearing means which is obliquely disposed at approximately 45 degrees with respect to the center line of said shank portion and bearing means, a cap portion in removable connection with the relatively fixed bearing portion and providing a crank shaft bearing surface extending arcuately for approximately 180 degrees across the bottom and about the other side of the bearing means and terminating at the said diameter, the relatively fixed bearing portion and cap portion of said bearing means having complementary mating faces respectively extending upwardly from said diameter at one side of said bearing means and downwardly from said diameter at the opposite side of said bearing means and having interlocked transverse ribs and grooves, the cap portion having apertures communicating through the respective faces aforesaid, and bolts connected with the fixed bearing portion and extending through the apertures transversely of the connecting rod and providing means for detachably connecting the removable cap portion to the fixed bearing portion of said rod.

3. The devices set forth in claim 2 in which each of said mating surfaces is provided with a plurality of said ribs and grooves.

4. The device set forth in claim 2 in which the mating surfaces of said members extending in one direction from said plane have a single rib and a single groove.

JOHN H. HOLLOWAY.

REFERENCES CITED

The following references are of record in the file of this patent:

UNITED STATES PATENTS

| Number | Name | Date |
| --- | --- | --- |
| 334,418 | Drake | Jan. 19, 1886 |
| 2,145,864 | Denneen et al. | Feb. 7, 1939 |